(12) United States Patent
Fox et al.

(10) Patent No.: US 11,005,845 B2
(45) Date of Patent: May 11, 2021

(54) NETWORK DEVICE VALIDATION AND MANAGEMENT

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Gregory J. Boss, Saginaw, MI (US); Sarbajit K. Rakshit, Kolkata (IN)

(73) Assignee: INTERNATIONAL BUSINESS MACHINES CORPORATION, ARMONK, NY

( * ) Notice: Subject to any disclaimer, the term of this patent is extended or adjusted under 35 U.S.C. 154(b) by 267 days.

(21) Appl. No.: 16/164,635

(22) Filed: Oct. 18, 2018

(65) Prior Publication Data

US 2020/0128017 A1    Apr. 23, 2020

(51) Int. Cl.
*H04L 29/06* (2006.01)
*H04W 12/08* (2021.01)
*H04L 12/26* (2006.01)

(52) U.S. Cl.
CPC ............ *H04L 63/102* (2013.01); *H04L 43/04* (2013.01); *H04L 43/065* (2013.01); *H04L 43/0817* (2013.01); *H04L 63/126* (2013.01); *H04W 12/08* (2013.01)

(58) Field of Classification Search
CPC ... H04L 63/126; H04L 63/102; H04L 63/145; H04L 43/0817; H04L 43/04; H04L 43/065; H04W 12/08
USPC .................................................. 726/4
See application file for complete search history.

(56) References Cited

U.S. PATENT DOCUMENTS

| | | | |
|---|---|---|---|
| 7,127,613 B2 | 10/2006 | Pabla et al. | |
| 7,360,242 B2 * | 4/2008 | Syvanne | H04L 63/0227 713/187 |
| 8,256,003 B2 * | 8/2012 | Dadhia | H04L 63/1416 726/25 |
| 8,539,567 B1 | 9/2013 | Logue et al. | |
| 9,075,690 B2 * | 7/2015 | Natchadalingam | G06F 9/45533 |
| 9,754,097 B2 | 9/2017 | Hessler | |
| 2002/0095607 A1 * | 7/2002 | Lin-Hendel | G06F 21/55 726/24 |
| 2004/0162992 A1 * | 8/2004 | Sami | H04L 61/20 726/13 |

(Continued)

OTHER PUBLICATIONS

Ostrenga, Ron, Stephen Schwab, and Robert Braden. "A Plan for Malware Containment in the DETER Testbed." DETER. 2007. (Year: 2007).*

(Continued)

*Primary Examiner* — Syed A Zaidi
(74) *Attorney, Agent, or Firm* — Cuenot, Forsythe & Kim, LLC (57) ABSTRACT

A second device seeking to access a network can be detected using a first device communicatively coupled to the network. Responsive to detecting the second device seeking to access the network, the first device can be caused to communicatively uncouple from the network and whether the second device poses a risk of corrupting the network's intended functioning if the second device accesses the network can be determined by the first device.

20 Claims, 5 Drawing Sheets

(56) References Cited

U.S. PATENT DOCUMENTS

| | | |
|---|---|---|
| 2005/0120246 A1 | 6/2005 | Jang et al. |
| 2006/0200856 A1 | 9/2006 | Salowey et al. |
| 2007/0067838 A1* | 3/2007 | Bajko ................... H04W 12/06 726/11 |
| 2008/0184030 A1 | 7/2008 | Kelly et al. |
| 2009/0055648 A1 | 2/2009 | Kim et al. |
| 2009/0260064 A1 | 10/2009 | McDowell et al. |
| 2011/0010543 A1 | 1/2011 | Schmidt et al. |
| 2011/0225656 A1* | 9/2011 | Gruper ................ H04L 63/1433 726/25 |
| 2014/0171027 A1 | 6/2014 | Arkko et al. |
| 2015/0245195 A1 | 8/2015 | Zhao et al. |
| 2017/0093910 A1* | 3/2017 | Gukal ................. H04L 63/1425 |

OTHER PUBLICATIONS

Babu, M. Rajesh, and G. Usha. "A novel honeypot based detection and isolation approach (NHBADI) to detect and isolate black hole attacks in MANET." Wireless Personal Communications 90.2 (2016): 831-845. (Year: 2016).*
IP Com Search History (Year: 2020).*
NPL Search Terms (Year: 2020).*

* cited by examiner

NETWORK DEVICE VALIDATION AND MANAGEMENT

BACKGROUND

The present invention relates to the field of electronic device networking, and more particularly, to the validation and management of devices.

A smart home network typifies an aggregation of disparate electronic devices that when linked electronically can be accessed, controlled, and monitored remotely and can operate autonomically. The devices that make up a smart home network, for example, can be configured to provide the home's inhabitants with an ability to remotely monitor and control various built-in functions such as the home's lighting, temperature, security, door and window operations, and home entertainment system. Various "home automation" technologies can provide so-called "intelligent feedback" so that even conventional devices such as washing machines, lamps, and the like can be endowed with an "intelligence" that enables the devices to operate autonomically. A refrigerator, for example, when communicatively coupled to a smart home system can catalogue its contents, suggest menus, recommend healthy alternatives, and order replacements as the contents are used up.

Such systems easily extend to other structures such as office buildings, hotels, and the like. Each such system can be tailored to perform specific functions with different devices that can be remotely accessed, controlled, and monitored and that are able to operate autonomically.

SUMMARY

A method includes detecting, using a first device communicatively coupled to a network, a second device seeking to access the network. The method also includes causing the first device to communicatively uncouple from the network responsive to detecting the second device seeking to join the network. The method further includes determining with the first device, now uncoupled from the network, whether the second device poses a risk of corrupting intended functioning of the network if the second device accesses the network.

A system includes a processor communicatively coupled to a first device that communicatively couples and uncouples from a network. The processor can be programmed to initiate executable operations. The processor includes a network device identifier that, while the first device is communicatively coupled to a network, detects when a second device seeks to access the network. The processor additionally includes a network isolator that causes the first device to communicatively uncouple from the network responsive to detecting the second device seeking to join the network. The processor further includes a network device interrogator that, using the first device now uncoupled from the network, determines whether the second device poses a risk of corrupting the network's intended functioning if the other device accesses the network.

A computer program product includes a computer readable storage medium having program code stored thereon. The program code is executable by a data processing system to initiate operations. The operations include automatically detecting, with a first device communicatively coupled to a network, a second device when the second device seeks to access the network. The operations also include, responsive to automatically detecting the second device, causing the first device to communicatively uncouple from the network. The operations additionally include automatically determining with the first device whether the second device poses a risk of corrupting the network's intended functioning if the second device accesses the network.

DETAILED DESCRIPTION

The present disclosure relates to electronic device networking, and more particularly, to validating and managing devices that when communicatively coupled to one another in some fashion define a network such as a smart network To efficiently manage various devices that comprise a network such as a smart home system, each of the various devices must connect to and share information over a communication channel. More particularly, the devices need to gather and share information with other devices communicatively linked together via an ad hoc network, or, depending on the features of the network, linked to a centralized network server.

Considerable efficiencies and convenience can be achieved by communicatively coupling various devices into a single network. This is especially so if the devices are smart devices whose acquired "intelligence" allows the devices to be accessed, controlled, and monitored remotely and/or operate autonomically. Among the advantages provided by such a network are enhanced productivity, automation of repetitive tasks, control of devices, and ease of access to various system functions.

Notwithstanding these advantages, however, such a system can pose a risk—namely, that an electronic device newly introduced to the network may be infected with a virus or malware. The infection may occur before installation, but not be evident until the new device joins the network. If a device is infected by a virus or malware, it may well infect the entire network after it joins that network. An exemplary scenario is one in which a recently acquired device that is infected with a virus is connected to a smart home, office, or hotel network. When made a member of the smart device group domain, the new device can infect the other devices that are already communicatively coupled to the smart network.

In accordance with the inventive arrangements disclosed herein, a device communicatively coupled to other devices in a network can autonomically determine whether a new device seeking to access the network poses a risk of corrupting the network and infecting other devices, and can make the determination before network access is granted to the new device. The device, upon detecting the presence of the new device, can communicatively uncouple from the network so that it can perform a device validation procedure in isolation from the rest of the network. Isolated from the network, the validating device can communicate with the new device and perform diagnostic testing, but it can do so without exposing the rest of the network to possible corruption from a virus or malware that might be introduced to the network if the new device were granted access to the network.

More particularly, in a network such as a smart network comprising multiple devices, one of the devices (defining a first device) can be used to detect and identify a new device (defining a second device) seeking to access the network. Responsive to detecting and identifying the second device, the first device can communicatively uncouple from the network. With the first device isolated from the network, the first device can communicate with the second device without exposing the network to any virus or malware that might be introduced into the network if the second device obtains access to the network. Diagnostic testing of the second device can be accomplished using a communication channel established between the first device the second device while the network remains protectively isolated. The second device is granted access to the network only if it is determined to pose no risk of corrupting the network.

In describing various inventive arrangements, the following definitions apply throughout this disclosure.

As defined herein, "data processing system" means one or more hardware systems configured to process data, each hardware system including at least one processor programmed to initiate executable operations and memory.

As defined herein, "processor" means at least one hardware circuit (e.g., an integrated circuit) configured to carry out instructions contained in program code. Examples of a processor include, for example, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, "computer readable storage medium" means a storage medium that contains or stores program code for use by or in connection with an instruction execution system, apparatus, or device. As defined herein, a "computer readable storage medium" is not a transitory, propagating signal per s.

As defined herein, "device" means any device that performs one or more functions and includes electronic circuitry configured to cause the device to perform the function or functions. Such devices include standalone devices, such as a general-purpose computer, an application-specific computer, a laptop, a telephone or smartphone, thermostat, television, stereo and appliance (e.g., microwave oven, refrigerator, stove, dishwasher), as well as, one or more of the components that collectively comprise a system such as a home theater and entertainment system, security system (e.g., cameras, motion sensors, and alarm), premises lighting system, home or building irrigation system, HVAC system components, and the like.

As defined herein, "networked device" means a device linked to a network via electronic communications circuitry that enables the device to communicatively couple with other devices comprising a network. As so defined, a networked device can include any device—for example, a phone, vehicle, home appliance, sensor, actuator, or other physical device—having hardwired circuitry and/or software executing on a processor enabling the device to convey, receive, and/or exchange data with other networked devices. Such a device can be communicatively linked, for an example, via the Internet of Things (IoT). Networked devices can be communicatively coupled to form, for example, a smart home network. Such devices include network infrastructure devices such as routers, firewalls, switches, access points and the like.

As defined herein, "client device" means a networked device that requests shared services from a server. A client device can be a networked device that predominately performs data processing internally and with limited reliance on a server, such as accessing a network and exchanging data with another networked device. Conversely, a client device can be a networked device that relies predominately on a server, which in the main performs data processing for the device (e.g., a device using a web application). Additionally, a client device can be one that performs processes internally, while relying on a server for storing processing data. Network infrastructure, such as routers, firewalls, switches, access points and the like, are not client devices as the term "client device" is defined herein.

As defined herein, "smart device" means an electronic device that can be accessed, controlled, and/or managed remotely and/or operate autonomically, and that also can connect to other devices or networks according to any of a variety of known protocols. These protocols include, for example, wireless protocols such as Bluetooth, Near-Field Communication (NFC), Wi-Fi, LiFi, 3G, and other such communication protocols for transmitting and/or receiving data and/or indicating position among devices. In the specific context of a smart home network, protocols include, for example, the RF-based Z-wave signaling and control communication protocol for home automation, the Universal Powerline Bus (UPB) protocol, the X10 standard protocol, and hardware-layer protocol ZigBee for operating on IEEE 802.15.4 radios.

As defined herein, "network" means a plurality of devices and data processing systems that communicate via one or more communication links. As defined, the network can be implemented as, or include, any of a variety of different communication networks, such as a wide area network (WAN), local area network (LAN), wireless network, mobile network, Virtual Private Network (VPN), the Internet, Public Switched Telephone Network (PSTN), and the like.

As defined herein, a "communication link" means a digital or analog link that provides a communication channel for transmitting and/or receiving digital or analog signals, and includes point-to-point links, broadcast links, multipoint links, and point-to-multipoint links that are provided by wired connections (twisted pair or coaxial cable), wireless signaling, and/or fiber optic cable.

As defined herein, "communicatively couple" and "communicatively coupled" means, respectively, establishing a communications link and connected via a communication link. Conversely, "communicatively uncouple" means disengaging from or breaking off a communications link.

As defined herein, "access," "accessing," "join," and "joining" mean establishing by any of several different mechanisms a communication link to a network, including to a central server around which the network is configured, and/or to any combination of the individual network devices communicatively coupled to form an ad hoc network.

As defined herein, "responsive to" means responding or reacting to an action or event. Thus, if a second action is performed "responsive to" a first action, there is a causal relationship between an occurrence of the first action and an occurrence of the second action, and the term "responsive to" indicates such causal relationship.

As defined herein, "detecting" means using a first device coupled to a network such as a smart home network to scan (e.g., SNMP protocol) or otherwise recognize a signal (e.g., WiFi signal) indicating a second device is positioned within a vicinity of the network such that it is capable of communicatively coupling with the network.

As defined herein, "identifying" means obtaining with a first device data associated with the second device, the data indicating a specific feature of the second device, such as the type of device, model, manufacturer, and functional capabilities.

As defined herein, "diagnostic testing" means a first device issuing a command signal to a second device causing the device to perform a unique function the second device is known to be capable of performing or a generic function (e.g., turn on, turn off, operate for a designated period of time before ceasing operation) and monitoring with the first device the second device's performance of the function. For example, in the context of a smart home network, a network camera (first device) signals a motion-detecting light sensor (second device) to turn on and detects whether the sensor's light responds by turning on.

As defined herein, "automatically" means without user intervention.

As defined herein, "corrupting" means modifying or destroying the capability of electronic circuitry within a device and/or software that executes on a processor of the device such that the device does not function as intended by a legitimate user of the device.

As defined herein, "risk of corrupting" means creating a condition or non-zero probability of corrupting a device. The condition can result from communicatively coupling with another device infected with a software virus or malware.

As defined herein, "user" means a person (i.e., a human being).

As defined herein, the term "real-time" means a level of processing responsiveness that a user or system senses as sufficiently immediate for a particular process or determination to be made, or that enables the processor to keep up with some external process.

Figure 1:
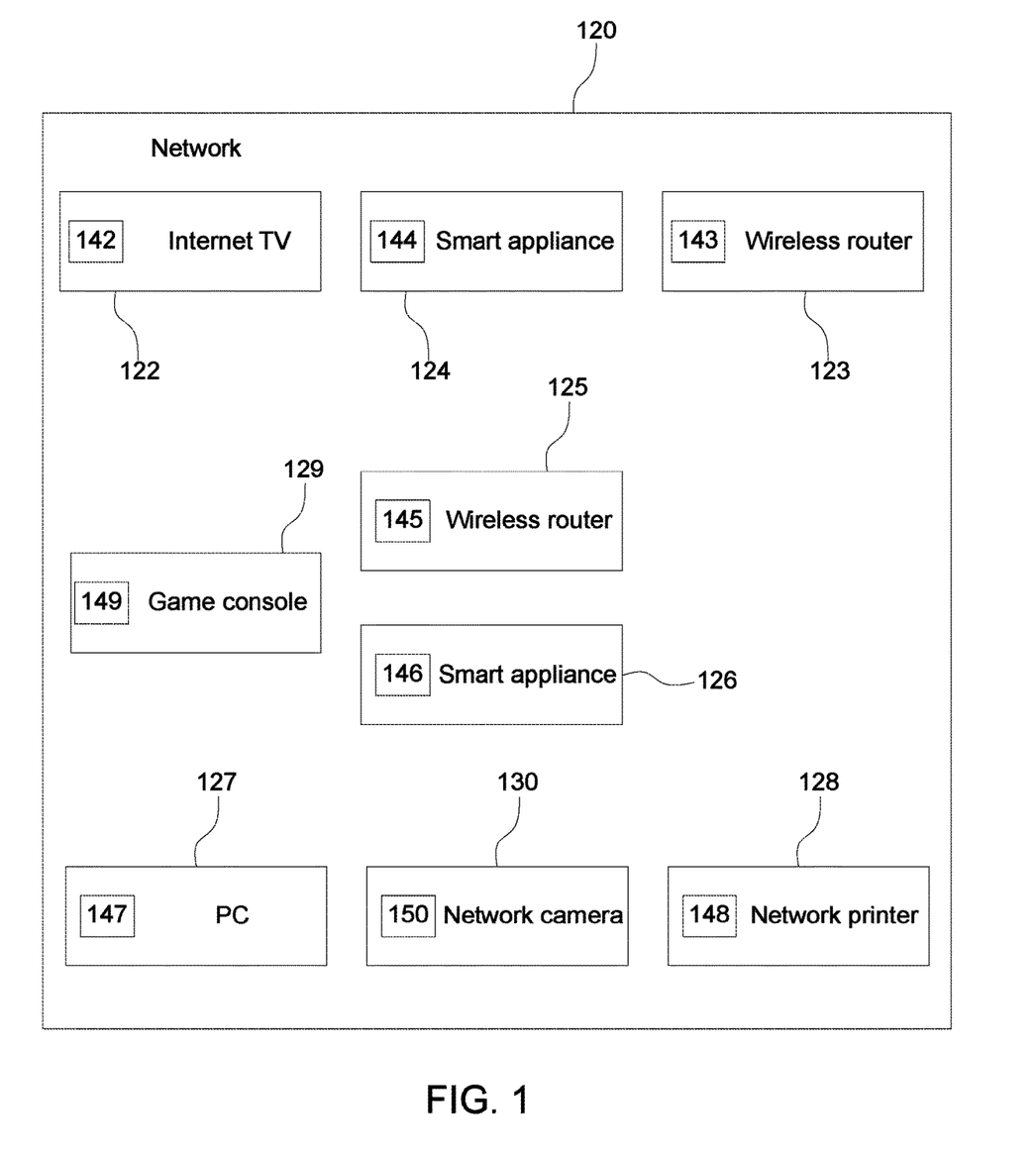
FIG. 1 is a block diagram illustrating a network comprising a plurality of devices.

Referring initially to FIG. 1, a network 120 comprising a plurality of devices 122-130 is shown. One or more of the devices 122-130 can be, for example, client devices. Illustratively, the network 120 is a smart home network and the devices are an Internet-enabled TV 122, a laptop computer 123, a "smart" home appliance (e.g., washer/dryer) 124, a wireless router 125, another smart home appliance (e.g., home security system) 126, a tablet PC 127, a network printer 128, a game console 129, and a network camera 130. In different arrangements, however, the network 120 can include more or fewer devices. The devices 122-130, moreover, can be many different types besides the ones specifically mentioned. The devices comprising the network 120 can include various types of devices, such as client devices and smart devices, as well as network infrastructure devices such as routers and firewalls.

In various arrangements described herein the devices 122-130, regardless of type, have inherent capabilities for communicatively coupling to and uncoupling from the network 120. Each of the devices 122-130 in FIG. 1 illustratively includes smart-device circuitry 142, 143, 144, 145, 146, 147, 148, 149, 150 that endows it with "intelligence" enabling it to be accessed, monitored, and/or controlled remotely and/or operate autonomically. For example, a device communicatively coupled to the network 120 can be a smart refrigerator that periodically inventories its contents and communicates a message via the network 120 to the laptop computer 123 or tablet PC 127 notifying a user that refrigerated supplies need to be replenished, possibly even indicating which specific items need to be purchased. The smart-device circuitry 142-150 can be hardwired logic circuitry, a processor with corresponding code executing thereon, or a combination of both.

The devices 122-130 can be communicatively coupled to a server, for example, through a router via a wireline connection or wirelessly via an access point of a network infrastructure device. In an alternative arrangement, however, the network 120 can be a decentralized, ad hoc network in which the devices 122-130 can be communicatively coupled without accessing a central server. An example is a hospital ad hoc wireless network comprising sensors, remote-access monitors, and other medical devices that are communicatively coupled wirelessly without using a common server. Other examples of centralized and ad hoc networks will be apparent in view of the explicit examples described herein.

Though not explicitly shown in FIG. 1, the network 120 can rely on one or more different types of equipment to establish a physical layer, data link layer, and network layer to provide network connectivity to the various devices 122-130. Such equipment includes, for example, an Ethernet interface to a service provider's native telecommunications infrastructure. (In a home network this is typically provided by a DSL modem or cable modem.) A router can be used to manage network layer connectivity by performing network address translation and thereby providing the various devices 122-130 a shared address. The network 120 can include a device with an integrated access point and/or an Ethernet switch. An access point can be provided, for example, by a router with a built-in wireless access point, thereby enabling one or more of the devices 122-130 to connect to the network wirelessly. A network switch can allow the devices 122-130 to communicate via Ethernet. Certain devices (e.g., IP cameras and IP phones) may require a non-standard port feature such as Power over Ethernet (PoE). Additionally, an automation controller can provide low-power wireless connectivity to non-data-intensive devices and systems such as lighting devices and security systems.

Figure 2:
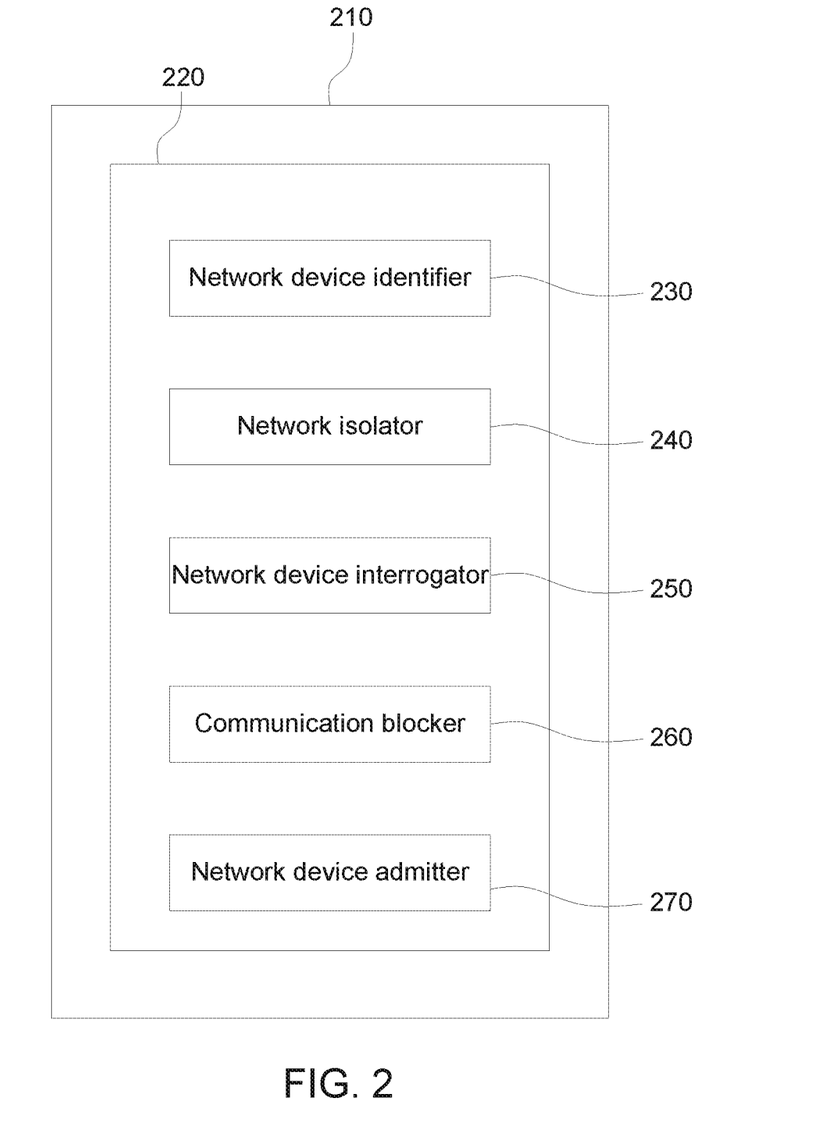
FIG. 2 is a block diagram of a system for validating and managing the devices such as those that constitute the network shown in FIG. 1.

Referring additionally now to FIG. 2, a network device validation and management system 210 is shown. The system 210 includes a processor 220 that communicatively couples to a first device. Any one of the devices 122-130 shown in FIG. 1 can operate as the first device. The system 210 does not communicate directly with the network 120 of FIG. 1. Rather, the system 210 communicates with the network 120 via the communication channel linking the processor 220 and the first device, the latter being capable of communicatively coupling and uncoupling from the network. The processor 220 is programmed to initiate executable operations that effect autonomic network device validation and management according to the arrangements described herein.

The processor 220 includes a network device identifier 230. The network device identifier 230, with the first device communicatively coupled to the network 120, detects when a second device seeks to access the network and identifies the device.

Additionally, the processor 220 includes a network isolator 240. The network isolator 240 causes the first device to communicatively uncouple from the network 120 responsive to detecting the second device seeking to join the network.

The processor 220 further includes a network device interrogator 250. The network device interrogator 250 determines whether the second device poses a risk of corrupting the network's intended functioning in the event that the second device gains access to the network 120.

In one arrangement, the processor 220 optionally includes a communication blocker 260. The communication blocker 260 prevents the second device from accessing the network if the network device interrogator 250 determines that the second device presents a risk of corrupting the network's intended functioning. In another arrangement, the processor 220 optionally includes a network device admitter 270 that, responsive to the network device interrogator 250 determining that the second device poses no risk, grants the second device access to the network 120. In still another arrangement, the network device interrogator 250 additionally performs diagnostic testing on the first device, permitting it to communicatively recouple with the network 120 only if the network device interrogator determines that the first device poses no risk to the network, notwithstanding its communication with the second device.

Figure 3:
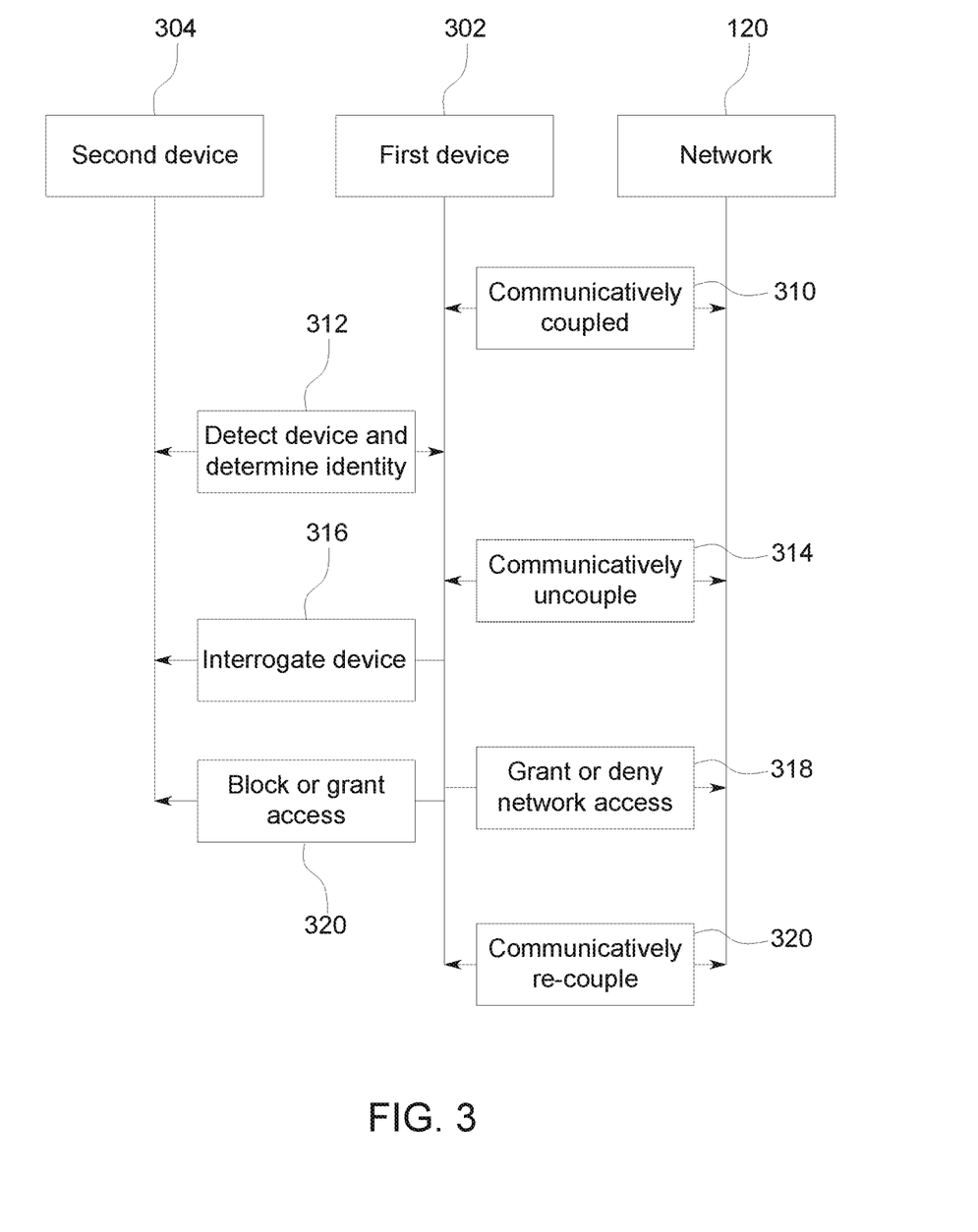
FIG. 3 is signaling diagram illustrating operative features of the system shown in FIG. 2.

FIG. 3 illustrates specific operative features of the system 210 shown in FIG. 2 in the context of the network 120 shown in FIG. 1. The method can be performed in real-time. Initially, at 310, a first device 302 is communicatively coupled to the network 120. At 312, the network device identifier 230 of the system 210 determines that a second device 304 capable of communicating via either a wired or wireless connection is seeking to join the network 120.

More particularly, the first device 302, while communicatively coupled with the network 120, detects the second device 304. The first device 302 is also communicatively coupled to the processor 220 and can thus inform the system 210 of the second device's presence. Responsive to the detected presence, the network device identifier 230 determines whether the second device 304 is seeking to join the network 120 and, if so, determines the identity of the device.

Responsive to the network device identifier 230 identifying the second device 304 attempting to access the network 120, the network isolator 240, at 314, causes the first device 302 to communicatively uncouple from the network 120. Because the system 210 does not communicate directly with the network 120, the system, as well as the first device 302 to which it is communicatively coupled, is now isolated from the network.

With the first device 302 (and thus the system 210) isolated from the network 120, the network device interrogator 250, at 316, interrogates the second device 304 to determine whether the second device poses a risk of corrupting the network's intended functioning if it gains access to the network. The network device interrogator 250 can determine whether the second device 304 poses a risk of corrupting the network's intended functioning by establishing a communications link with the second device 304 and performing diagnostic testing of the second device over the established communication channel.

Notwithstanding the establishment of a communication channel with the second device prior to a final determination of whether it poses a risk to the network 120, the network is protected from the introduction of malware or a virus from the second device 304. The network 120 is protected once the network isolator 240 causes the first device 302 (and hence the system 210) to communicatively uncouple from the network. It is this aspect that allows the system 210 to perform diagnostic testing of the second device 304 with the network device interrogator 250 without exposing the network 120 or other networked devices to malware or a virus carried by the second device. Although the first device 302 communicatively coupled with the system's processor 220 may be at risk from communicating with the second device 304, the rest of the network 120 remains protected so long as the first device is communicatively uncoupled and isolated from the network.

To further protect the network 120 when there is communication with the second device 304, the network device interrogator 250 can additionally establish a protected zone. The protected zone isolates the network 120 and any devices that remain communicatively coupled thereto, preventing them from communicating with the second device 304 seeking to access the network and enabling them to block extraneous signals that might arise out of communications that are part of the diagnostic testing of the second device.

The network device interrogator 250 can perform diagnostic testing by sending one or more instructions via an established communication channel between the first device 302 and the second device 304. The one or more instructions from the network device interrogator 250 can assign an activity or activities to the second device 304. The activities are predetermined functions that the second device 304, whose type has been identified by the network device identifier 230, is known to be configured to perform. Thus, the diagnostic testing is accomplished by issuing at least one instruction to the second device 304 causing the second device 304 to perform at least one predetermined function; monitoring the second device's performance of the at least one predetermined function using the first device 302; and assessing the second device's performance of the at least one predetermined function. Additionally, or in the event it is not known what specific functions the second device 304 is configured to perform, the activity assigned by the first device 302 can be to perform a generic function such as turn-on and turn-off or operate for a designated length of time and then cease operating.

At 318, if the network device interrogator 250 has determined that the second device 304 poses a risk to the network, then the communication blocker 260 responsive to that determination can prevent, at 320, the second device from joining the network 120. The communication blocker 260 can do so by transmitting a message to each device communicatively coupled to the network 120. The message can identify the second device 304 and instruct the devices to avoid communicating with the second device. Alternatively, if the network device interrogator 250 has determined that the second device poses no risk to network 120, then network device admitter 270 can grant the second device 304 access to the network at 320. For example, if the network is a centralized network in which devices are communicatively coupled via a common server, the network device admitter 270 can register the second device 304 with the server at 318. Otherwise, in a decentralized network, the network device admitter 270 can transmit, at 318, a message to each device communicatively coupled to the network identifying the second device 304 and instructing the devices to establish a communication link with the second device as needed to carry out the functions of the devices.

In an illustrative scenario exemplifying the operative features of the system 210, the network 120 is a smart home network comprising devices illustratively including Internet-enabled TV 122, laptop computer 123, smart home appliances 124, 126 (e.g., washer/dryer and home security system), tablet PC 127, network printer 128, game console 129, and network camera 130. Optionally, the network 120 one or more network infrastructure devices such as wireless router 125. During an environment and scope setup stage, the smart home network is set up and an inventory is made of each all devices communicatively coupled to the network

120. When a new device is introduced to the network 120 it can be scanned before being communicatively coupled to the network 120.

Any one of the devices 122-130 can operate as the first device when it is communicatively coupled to the processor 220 of the system 210. In the current scenario, the role of the first device is assumed by the network camera 130. The newly introduced device takes the role of second device, which in the present scenario is assumed to be a motion sensor that a user wants to connect to the existing network. Operating through the first device (network camera 130), the network device identifier 230 detects and identifies the second device (motion sensor), as described above. Responsive to the network device identifier 230 identifying the second device (motion sensor), the network isolator 240 causes the first device (network camera 130)—and thus the system 210—to communicatively uncouple from the network 120, as also described above. With the first device (network camera 130) isolated from the network 120, a one-way communication channel is initially set up and an introductory phase ensues.

During this phase, the network device interrogator 250 interrogates and performs diagnostic testing of the second device (motion sensor) by sending through the first device (network camera 130) a series of commands to perform certain activities (e.g., switch on, switch off, operate for a designated period of time and then cease operation) and observing how the second device (motion sensor) performs the activities in response to the commands. If the observed performance of the second device (motion sensor) is deemed adequate, then a two-way communication channel can be set up. Operating within the protected zone, described above, the diagnostic testing can be repeated with the system 210 operating through one or more of the devices 122-130 via the newly established second channel essentially as described in the context of the first, albeit with devices communicating within the protected zone thus ensuring that the network 120 remains protected.

Although the network device interrogator 250 can perform diagnostic testing acting solely through a single device (network camera 130), in an alternate arrangement, the system 210 may additionally operate through one or more other devices through which additional commands can be sent. Accordingly, each of several devices can be isolated from the network 120 by the system causing them to communicatively uncouple therefrom. While isolated, each can perform diagnostic testing of the device seeking access to the network 120.

The system 210 can interact with, or through, the devices 122-130 in several different ways. For example, the "smart" circuitry 142-150 can include a processor capable of executing computer code. Therefore, in one arrangement, the system 210 can be implemented in computer code that is executed utilizing a device's processor. Even once conventional devices such as home appliances (e.g., microwave oven, washer/dryer) are today manufactured as smart devices having at least limited data processing capabilities, thus making a code-based implementation of the system 210 feasible. According to another arrangement, if the system 210 is implemented as hardwired circuitry, the circuitry can be configured for integration with existing circuitry of one or more of the devices 122-130.

While the system 210 can be implemented in and as an addition to a networked device. It can also be implemented as a separate, standalone device that can communicatively couple to a network 120 and, responsive to detecting a device seeking to access the network, decouple from the network to perform diagnostic testing. For example, the system 210 can be implemented in a network infrastructure device such as a router or firewall. The system 210, responsive to detecting the device seeking to access the network 120, causes the network infrastructure device to uncouple from the network 120. With the network infrastructure device uncoupled and isolated, the system 210 can cause it to establish a communication channel with the device seeking to access the network 120. The system 201 can cause the now isolated network infrastructure device to perform diagnostic testing by issuing commands via the isolated communication channel to the device seeking to access the network 120.

Figure 4:
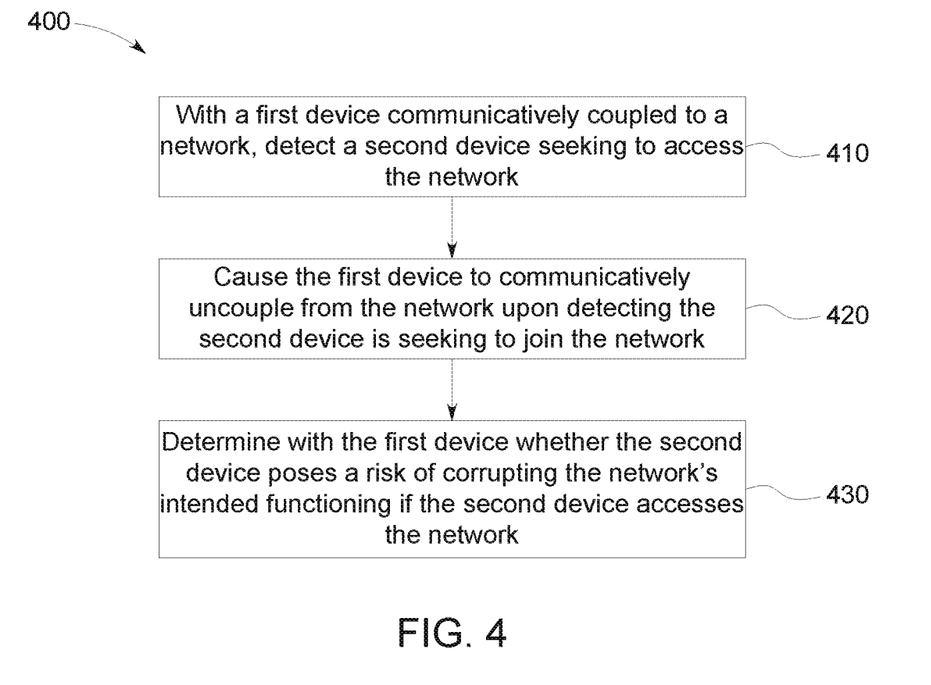
FIG. 4 is a flowchart of a method of validating and managing devices.

FIG. 4 is a flowchart illustrating an example of a method 400 for validating and managing devices communicatively linked to a network. The method 400 can be performed in real-time. The method 400 can be implemented using a system 210 having a processor 220 that communicatively couples to a device that itself communicatively couples and uncouples from the network. The processor 220 is programmed to initiate executable operations that isolate the device from the network 120 and, using the device, determine whether a new device seeking to access the network poses a risk of corrupting the network with a virus or malware.

The method 400 specifically can include, at 410, using a first device communicatively coupled to a network and detecting when a second device seeks access to the network. The method 400 also includes causing the first device to communicatively uncouple from the network, at 420, responsive to detecting that the second device is seeking to join the network. The method 400 further includes determining with the first device, at 430, whether the second device poses a risk of corrupting the network's intended functioning if the second device accesses the network.

The method 400 optionally can include establishing with the first device a protected zone that isolates the network from communication with the second device. The method 400 optionally can include performing a diagnostic test with the first device while the first device is operating within the protected zone. The diagnostic testing includes issuing at least one instruction to the second device thereby causing the second device to perform at least one predetermined function and assessing the second device's performance of the at least one predetermined function with the first device.

Figure 5:
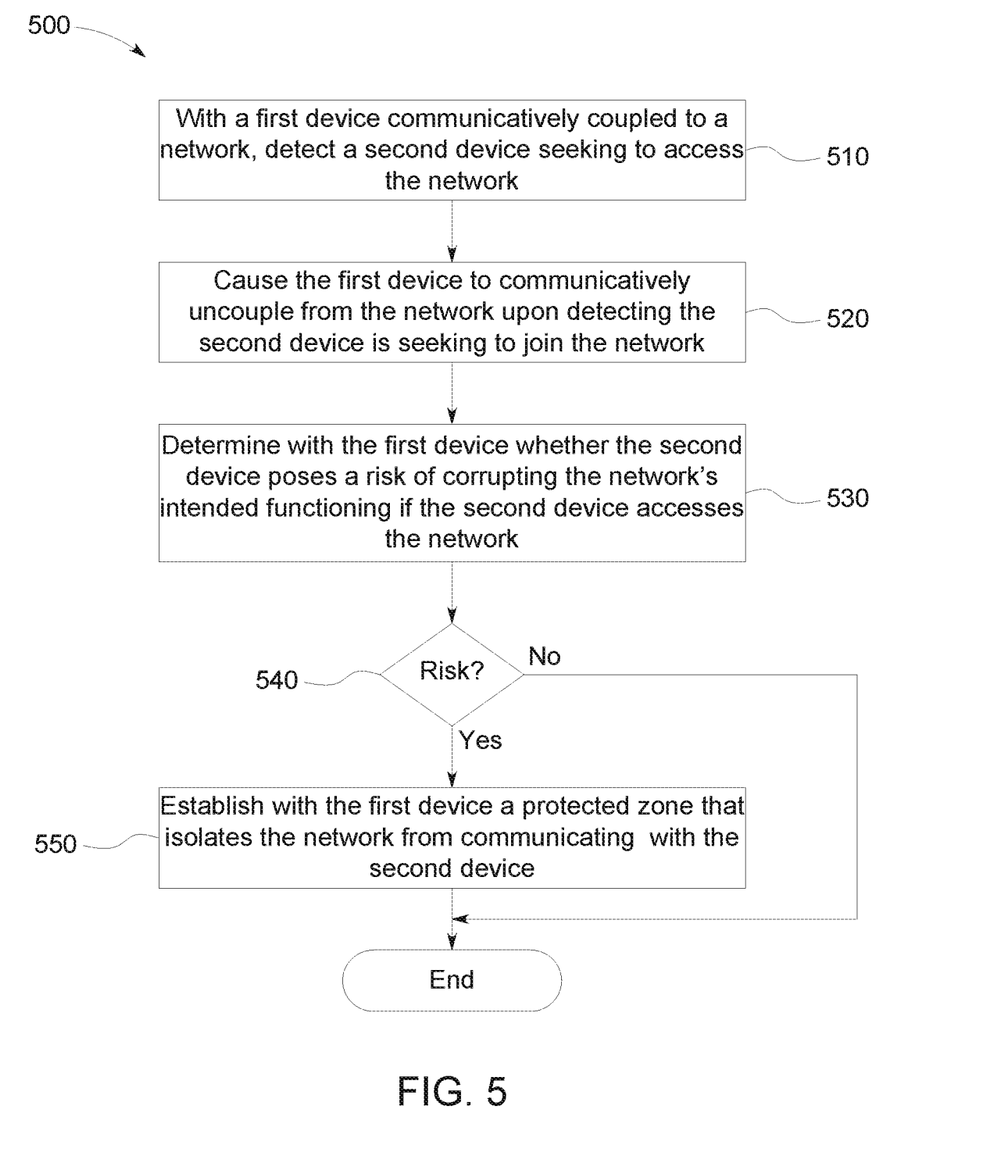
FIG. 5 is a flowchart of another method of validating and managing devices.

FIG. 5 is a flowchart illustrating another example of a method 500 for validating and managing devices communicatively linked to a network 120. The method 500 can be implemented using a system 210 having a processor 220 that communicatively couples to a device that itself communicatively couples and uncouples from the network. The processor 220 is programmed to initiate executable operations that isolate the device from the network and, with the device, determine whether a new device seeking to access the network poses a risk of corrupting the network with a virus or malware.

The method 500 specifically includes, at 510, using a first device communicatively coupled to a network and detecting when a second device seeks to access the network, causing the first device to communicatively uncouple from the network, at 520, responsive to detecting that the second device is seeking to join the network, and determining with the first device, at 530, whether the second device poses a risk of corrupting the network's intended functioning if the second device accesses the network. At 540, the decision is made whether to establish a protected zone to protect the network depending on whether the second device is determined to pose a risk or not. If the protected zone is established, testing can continue with one or more devices continuing to test the second device. If the device is determined not to pose a risk, the device is admitted to the network and can communicate with other devices communicatively linked thereto. Otherwise, the second device is blocked from communicating with the network and its devices.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
    detecting, using a first device communicatively coupled to a network, a second device seeking to access the network; and
    responsive to detecting the second device seeking to access the network, causing the first device to communicatively uncouple from the network and determining, by the first device, whether the second device poses a risk of corrupting intended functioning of the network if the second device accesses the network.

2. The method of claim 1, further comprising establishing, by the first device, a protected zone that isolates the network from the second device.

3. The method of claim 2, further comprising performing a diagnostic test with the first device operating within the protected zone, the diagnostic test comprising:
    issuing at least one instruction to the second device causing the second device to perform at least one predetermined function;
    monitoring, using the first device, the second device's performance of the at least one predetermined function; and
    assessing data indicating performance by the second device of the at least one predetermined function.

4. The method of claim 1, further comprising blocking the second device seeking to join the network from accessing the network responsive to the first device determining that the second device presents a risk of corrupting the intended functioning of the network.

5. The method of claim 1, further comprising using the first device to grant the second device access to the network responsive to the first device determining that the second device does not present a risk of corrupting the intended functioning of the network.

6. The method of claim 5, wherein granting the second device access to the network comprises registering the second device with a network server communicatively coupled to the network.

7. The method of claim 1, further comprising performing a diagnostic test on the first device to determine whether the first device presents a risk of corrupting the intended functioning of the network if the first device communicatively re-couples with the network after communicating with the second device.

8. A system comprising:
    a processor programmed to initiate executable operations including:
    detecting, using a first device communicatively coupled to a network, a second device seeking to access the network; and responsive to detecting the second device seeking to access the network, causing the first device to communicatively uncouple from the network and determining, by the first device, whether the second device poses a risk of corrupting intended functioning of the network if the second device accesses the network.

9. The system of claim 8, the executable operations further comprising establishing, by the first device, a protected zone that isolates the network from the second device.

10. The system of claim 9, the executable operations further comprising performing a diagnostic test with the first device operating within the protected zone, the diagnostic test comprising:
  issuing at least one instruction to the second device causing the second device to perform at least one predetermined function;
  monitoring, using the first device, the second device's performance of the at least one predetermined function; and
  assessing data indicating performance by the second device of the at least one predetermined function.

11. The system of claim 8, the executable operations further comprising blocking the second device seeking to join the network from accessing the network responsive to the first device determining that the second device presents a risk of corrupting the intended functioning of the network.

12. The system of claim 8, the executable operations further comprising using the first device to grant the second device access to the network responsive to the first device determining that the second device does not present a risk of corrupting the intended functioning of the network.

13. The system of claim 12, wherein granting the second device access to the network comprises registering the second device with a network server communicatively coupled to the network.

14. The system of claim 8, the executable operations further comprising performing a diagnostic test on the first device to determine whether the first device presents a risk of corrupting the intended functioning of the network if the first device communicatively re-couples with the network after communicating with the second device.

15. A computer program product, comprising:
  a computer readable storage medium having program code stored thereon, the program code executable by a data processing system to initiate operations including:
  detecting, using a first device communicatively coupled to a network, a second device seeking to access the network; and
  responsive to detecting the second device seeking to access the network, causing the first device to communicatively uncouple from the network and determining, by the first device, whether the second device poses a risk of corrupting intended functioning of the network if the second device accesses the network.

16. The computer program product of claim 15, the operations further comprising establishing, by the first device, a protected zone that isolates the network from the second device.

17. The computer program product of claim 16, the operations comprising performing a diagnostic test with the first device operating within the protected zone, the diagnostic test comprising:
  issuing at least one instruction to the second device causing the second device to perform at least one predetermined function;
  monitoring, using the first device, the second device's performance of the at least one predetermined function; and
  assessing data indicating performance by the second device of the at least one predetermined function.

18. The computer program product of claim 15, the operations further comprising blocking the second device seeking to join the network from accessing the network responsive to the first device determining that the second device presents a risk of corrupting the intended functioning of the network.

19. The computer program product of claim 15, the operations further comprising using the first device to grant the second device access to the network responsive to the first device determining that the second device does not present a risk of corrupting the intended functioning of the network.

20. The computer program product of claim 15, the operations further comprising performing a diagnostic test on the first device to determine whether the first device presents a risk of corrupting the intended functioning of the network if the first device communicatively re-couples with the network after communicating with the second device.

* * * * *